United States Patent Office 2,748,685
Patented June 5, 1956

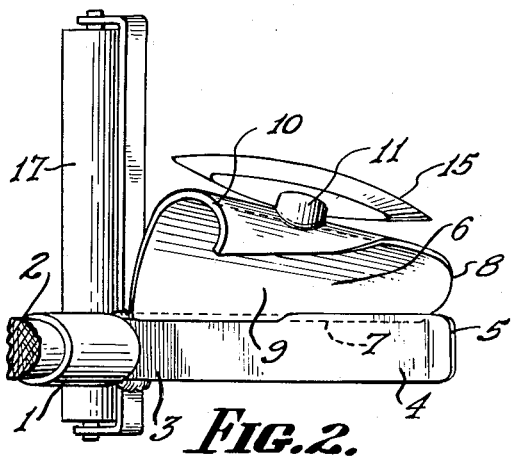
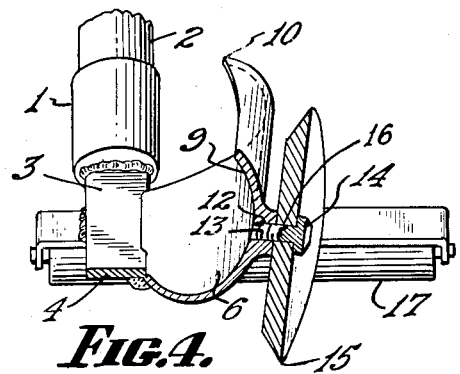
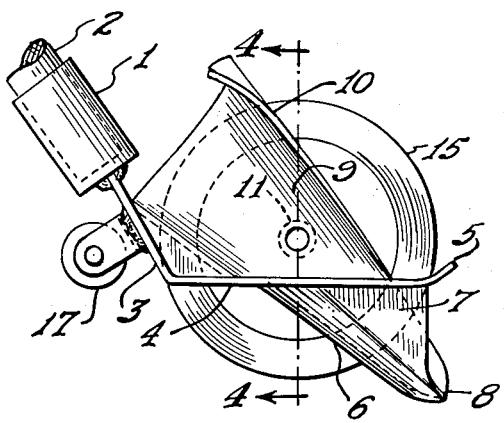
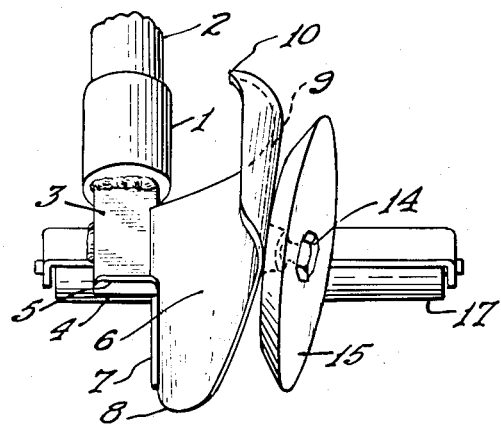
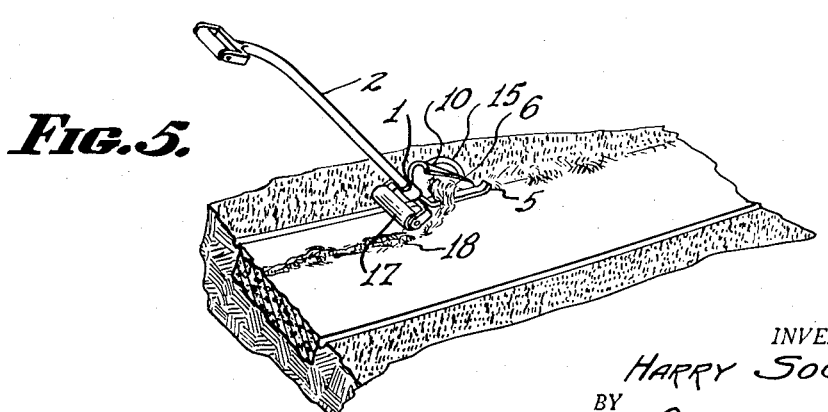
INVENTOR.
HARRY SOGAR,
BY
ATTORNEYS

2,748,685

LAWN AND WALK EDGER

Harry Sogar, Ludlow, Ky.

Application October 14, 1952, Serial No. 314,589

1 Claim. (Cl. 97—227)

My invention relates to lawn edge trimmers of the type required to cut a neat edge of grass on the lawn bordering on a cement sidewalk or other type of hard surfaced walk.

In the lawn edge trimmers such as are on the market in hardware stores many of the mechanical features of my novel lawn edge trimmers have been employed but without the particular combination which I employ by means of which no adjustments of the equipment or particular technique of operation are required in order for anyone to perform a satisfactory lawn edge trimming job.

It is old to have a coupling member with a push handle, to have a flat guide bar to pass along the edge of the sidewalk surface, to have a plow share which cuts a furrow along the edge of the walk and to have a rotary disc cutter to cut the edge of the lawn; but unless these elements are combined and arranged in a particular manner, unless through long practice one has acquired great skill in manipulating such devices, the furrow cutter becomes clogged up and a series of jerky pushing movements are required on the push handle which results in an uneven jagged appearance to the lawn border.

It is an object of my invention to provide a tool which is simple to operate and which can be pushed continuously along the edge of a walk, in which clogging of the plow share is avoided.

The foregoing objects and other objects to which reference will be made in the accompanying drawings I accomplish by that certain combination and arrangement of parts of which I have shown, in the drawings, a preferred embodiment.

In the drawings:

Figure 1 is a side elevation of the lawn edger of my invention.

Figure 2 is a plan view of the edger.

Figure 3 is a front elevation of the edger.

Figure 4 is a sectional view along the lines 4—4 of Figure 1.

Figure 5 is a perspective view showing the edger in use.

The support for the device comprises a coupling member 1 in which a push handle 2 is secured. Welded to the coupling is a plate 3 which extends down and at an obtuse angle has the sidewalk guide bar 4 connected preferably integrally therewith. The guide bar is a flat horizontal plate having an upturned end 5 and it slides along on the walk.

The guide bar has a plow share generally indicated at 6, connected to it preferably by welding. The plow share has a flat side the edge of which extends down at substantially a right angle. The angle formed is the guide along the corner edge of the sidewalk. The cutting tip 8 of the plow share is sharpened so as to gouge out a furrow of dirt along the edge of the walk. The plow share has another side wall member 9 which extends up and is curved over as indicated at 10 to cause the earth which is gouged out to drop or be directed onto the sidewalk instead of clogging up in the circular trough of the plow share.

The particular shape and dimensions of my plow share are important features of my invention. On the outer surface of the turn-over wall of the plow share I have shown a boss 11 which is threaded as indicated at 12 to receive the threaded end 13 of a stud bolt 14 which mounts the circular cutting disc 15. To prevent binding of the rotary cutter disc the shank of the stud is smooth for at least the thickness of the cutter disc as indicated at 16.

The mounting of the cutter disc which, it will be noted, is not in parallel alignment with the direction of travel of the tool is important. I find that most satisfactory shearing results in cutting the grass edge along the line of the side of the furrow opposite the sidewalk edge is accomplished if the cutting edge of the disc has both a cutting and frictional pulling effect. This is accomplished by arranging the spindle for the disc at an obtuse or oblique angle which causes the cutting edge of the disc to incline in toward the cutting tips of the plow share.

Carrying the plow share and grass cutter is a carrying roller 17 which extends from the sidewalk onto the grass or from beyond the inner edge of the walk guide to beyond the edge of the cutter disc. The functioning operation of furrow digging and grass cutting is intermediate the ends of the rolling support.

In operating the edger, all that an operator need do is seat the device on the edge of the walk and continuously push the tool along the extent of the walk. The edge furrow is continuously cut and the dirt deposited in a band, as indicated at 18 on the sidewalk. The grass at the edge of the lawn is continuously cut and falls into the bottom of the furrow. The cleaning up operation consists merely in sweeping up the dirt from the furrow which is left on the sidewalk.

Modifications in the relative size and arrangement of parts will occur to those skilled in the art without departing from the principle of my combination.

Having thus described my invention what I claim as new and desire to secure by Letters Patent is:

In combination in a lawn edger, a coupling member provided with means for attachment to a push handle, a flat sidewalk guide bar, a rolling support mounted on the guide bar, a plow share having a concave sharpened edge extending down substantially below the guide bar having one side extending down at substantially a right angle to form a sidewalk edge guide and the other side extending up and contoured so as to discharge the earth from the furrow as it is cut over the guide bar onto the walk, said plow share having a boss and an axle member mounted in the boss, a rotary grass cutting disc mounted on the axle which is inclined from a vertical direction so that the cutting disc inclines inwardly toward the cutting tip of the plow share and at an acute angle to the right angle side of the plow share, said rolling support extending on one side beyond the side edge of the guide bar and on the other beyond the cutting disc.

References Cited in the file of this patent

UNITED STATES PATENTS

| | | |
|---|---|---|
| 1,338,123 | Coniglio | Apr. 27, 1920 |
| 2,032,467 | Burke | Mar. 3, 1936 |
| 2,204,246 | Brooks | June 11, 1940 |
| 2,682,825 | Warholoski | July 6, 1954 |